United States Patent [19]
McCarthy

[11] Patent Number: 5,333,191
[45] Date of Patent: Jul. 26, 1994

[54] DETECTION OF MULTIFREQUENCY TONE SIGNALS

[75] Inventor: Brian M. McCarthy, Lafayette Hill, Pa.

[73] Assignee: InterDigital Technology Corporation, Wilmington, Del.

[21] Appl. No.: 51,189

[22] Filed: Apr. 22, 1993

[51] Int. Cl.$^5$ ............................................. H04M 9/00
[52] U.S. Cl. .................................... 379/386; 379/282; 379/283; 379/351; 379/89
[58] Field of Search ............... 379/386, 282, 283, 351, 379/89; 328/130

[56] References Cited

U.S. PATENT DOCUMENTS 4,484,035 11/1984 Graham et al. ...................... 379/351
5,172,406 12/1992 Locke .................................... 379/386

OTHER PUBLICATIONS

Digital Spectral Analysis (Lawrence Marple, Jr.), 1987.
Modern Spectral Estimation (Steven M. Kay).

*Primary Examiner*—James L. Dwyer
*Assistant Examiner*—Jacques M. Saint-Surin
*Attorney, Agent, or Firm*—Robert S. Bramson; Nicholson Pine; Howard R. Popper

[57] ABSTRACT

A method of operating a digital signal processor to detect DTMF tones in a digital voice telephone system in which the digitally encoded signals appearing on the telephone channel are decimated to compress the spectrum to be monitored for the appearance of call signalling tones. The signals received in a decimated block are "correlated" or convolved with one another on a forward and backward time-shifted basis and each forward and backward correlation product is summed to form the elements of a 5×5 modified covariance matrix. The modified covariance matrix exhibits the desirable property that its eigenvectors will be symmetric. Since all eigenvectors of the modified covariance matrix are orthogonal and the eigenvectors associated with the signal span the signal subspace, the signal subspace is orthogonal to the eigenvector associated with the noise. The dot product of the noise eigenvector with the signal subspace is set to zero. The roots of the resultant polynomial identify the frequencies of the DTMF tones, if in fact the same were present in the received signal. The noise and signal eigenvectors of the modified covariance matrix are more quickly and efficiently determined and advantageously, on a "real time" basis, by partitioning the modified covariance matrix into conjugate and anti-conjugate submatrices. The conjugate matrix is inverted and its eigenvalues determined, advantageously by applying the well-known power method. The largest eigenvalue of the inverted conjugate submatrix is related to the smallest eigenvalue of the original modified covariance matrix. When appropriate tones are being received this last-mentioned eigenvector should be the eigenvector associated with the noise. After determining the noise eigenvector the product of the signal space vector and the noise eigenvector is set to zero and the roots of the resultant polynomial are identified as the frequencies of the DTMF tones, advantageously through the use of a fast search technique.

12 Claims, 2 Drawing Sheets

DETECTION OF MULTIFREQUENCY TONE SIGNALS

FIELD OF THE INVENTION

This invention relates to the detection of sinusoidal signals in the presence of noise and, more particularly, to the accurate detection of multifrequency signals used in telephonic call signalling.

BACKGROUND OF THE INVENTION

In-band call signalling systems use the same channel for carrying speech and for carrying call signalling messages. In early telephony systems the call signalling messages, consisting of dial pulses, preceded the appearance of voice signals on the channel. Later, dual tone multifrequency signalling came into use. These DTMF signals consisted of pairs of sinusoids lying within the frequency range of ordinary speech. This was possible because the call signaling tones would normally be permitted on only a portion of the telephone channel, usually before the complete end-to-end talking path was established, and so there was little likelihood that any speech components would be present while the DTMF signals were being detected. In the United States, DTMF signalling usually employs one tone in the high frequency group 1209, 1336, 1477 and 1633 Hz and one tone from the lower frequency group 697, 770, 852 and 941 Hz.

As telephony has progressed and as digital telephone systems have become more prevalent, it has become more common for both the speech and the call signalling information originating at a telephone set to be digitally encoded either at the telephone set or at a line concentrator serving a number of telephone sets. With both speech signals and DTMF signals being encoded at the same point, the subsequent digital bit stream looks no different when carrying voice, voice and signalling tones or only signalling tones. It has thus become important to be able to more definitely distinguish call signals from speech components. Moreover, it is now common for tone signalling to be employed even after the complete speech path has been set up for such enhanced applications as controlling voice mail disposition, banking by telephone, etc.

Many techniques are known for detecting sinusoids in general and DTMF signals in particular. One sophisticated arrangement, described in Oppenheim and Schafer, *Digital Signal Processing*, Prentice-Hall, Englewood Cliffs, N.J. 1975, employs a discrete Fourier transform known as Goertzel's algorithm to detect the presence of sinusoidal signals. Other approaches, discussed in U.S. Pat. No. 5,119,322 issued Jun. 2, 1992 propose to detect the DTMF tones by convolving the input signal with sampled values of a reference signal or by repetitively applying Goertzel's algorithm either at each of the DTMF frequencies or in coarse and fine mode. One implementation of Goertzel's algorithm employing digital signal processors is disclosed in an article entitled "Add DTMF Generation and Decoding to DSP-μP Designs" published in *Digital Signal Processing Applications with the TMS* 320 *Family*, Texas Instruments, 1989, vol. 1, p. 454 et seq. Basic spectral estimation techniques are disclosed in *Digital Spectral Analysis*, Marple, S. L., Prentice Hall 1987, pp. 64. While the importance of digitally detecting DTMF tones quickly and accurately has thus been recognized, more efficient techniques are desirable in such advanced digital applications as ISDN.

SUMMARY OF THE INVENTION

The illustrative embodiment of my invention is contemplated for use in a digital voice telephone system in which the digitally encoded signals appearing on the telephone channel are continuously sampled at twice the rate of the highest expected voice frequency component which is to be reproduced, e.g. 8 kHz. However, in accordance with one aspect of my invention, alternate samples are ignored. Decimating the sampled signals compresses the spectrum to be monitored for the appearance of call signalling tones. After decimation any speech components lying above 2 kHz that may have been present in the original signal will be aliased and appear as part of the background "noise" against which the call signalling sinusoids are to be detected, thereby increasing the margin against the false detection of a speech component as a tone signal. Since the highest frequency signalling tone lies below 2 kHz, no legitimate signalling tone will be aliased.

In accordance with a further aspect of my invention, it is to be appreciated that the two signalling tones, if present, give rise to 4 complex frequencies. The received signals are "correlated" or convolved with one another on a forward and backward time-shifted basis and each forward and backward correlation product is summed to form the elements of a 5×5 modified covariance matrix. The modified covariance matrix exhibits the desirable property that its eigenvectors will be symmetric. Since all eigenvectors of the modified covariance matrix are orthogonal and the eigenvectors associated with the signal span the signal subspace, the signal subspace is orthogonal to the eigenvector associated with the noise. The dot product of the noise eigenvector with the signal subspace is set to zero. The roots of the resultant polynomial identify the frequencies of the DTMF tones, if in fact the same were present in the received signal.

More particularly and, in accordance with a further aspect of the illustrative embodiment of my invention, the noise and signal eigenvectors of the modified covariance matrix are more quickly and efficiently determined and advantageously, on a "real time" basis, by partitioning the modified covariance matrix into conjugate and anti-conjugate submatrices. The conjugate matrix is inverted and its eigenvalues determined, advantageously by applying the well-known power method. The largest eigenvalue of the inverted conjugate submatrix is related to the smallest eigenvalue of the original modified covariance matrix. When appropriate tones are being received this last-mentioned eigenvector should be the eigenvector associated with the noise. After determining the noise eigenvector the product of the signal space vector and the noise eigenvector is set to zero and the roots of the resultant polynomial are identified as the frequencies of the DTMF tones, advantageously through the use of a fast search technique.

However, in accordance with a still further aspect of the illustrative embodiment of my invention, false detection of signal tones is inhibited by a number of additional digital signal processing steps. The mean square value of the signals received within a frame interval is computed to make sure that the tone signals if apparently present are of the appropriate signal strength for at least a minimum time duration. This is accomplished by computing the mean square value of overlapping sub-blocks of signals in the frame interval. In addition, the detected tones are compared with standards to determine that they do not diverge too far from the expected frequencies. Most importantly, however the size of the two smallest eigenvalues of the modified covariance matrix are compared. The smallest of these should correspond to the eigenvalue of the noise while the next smallest eigenvalue should correspond to one of the complex signalling frequencies arising from the DTMF tones, if such a tone is present. If the ratio of these eigenvalues is less than an experimentally predetermined threshold, the noise eigenvector is set to zero and a "no tone present" is indicated for the monitored block of signals.

BRIEF DESCRIPTION OF THE DRAWING

The foregoing and other objects and features of my invention may become more apparent by referring now to the Figures of the drawing in which.

GENERAL DESCRIPTION

Figure 1:
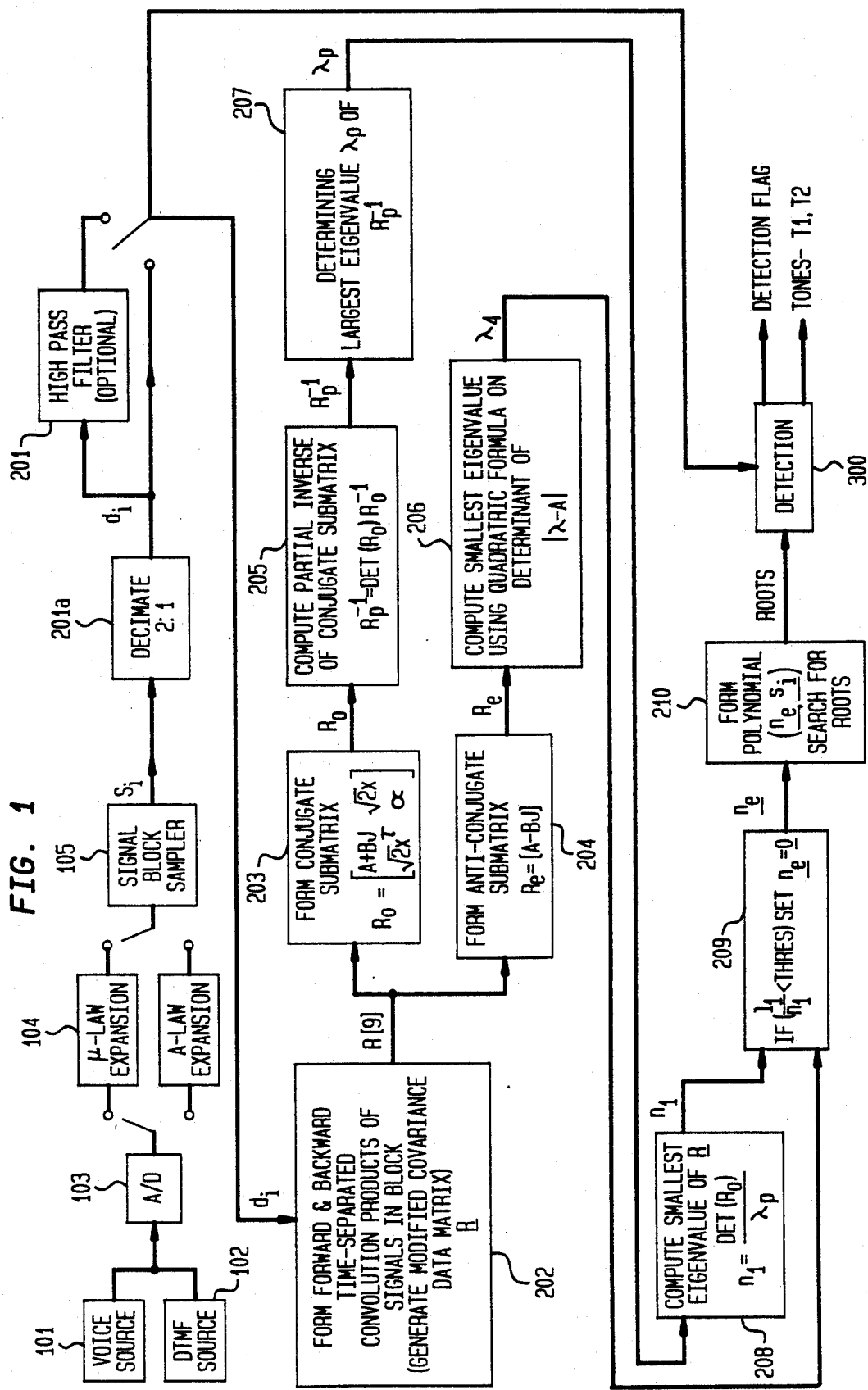
FIG. 1 is a block diagram showing the principal steps of my process for monitoring the voice channel for the appearance of DTMF signals and for assuring that voice components will not falsely be detected as DTMF signals.

The apparatus depicted in the upper left-hand portion of FIG. 1 shows a typical arrangement for generating a bit stream containing code words that may carry both voice and DTMF signals. More particularly, voice frequency signals from source 101 and DTMF signals from source 102 may each be applied to analog-to-digital converter 103 at different times, or even at the same time, depending on the needs of the telephone user. A/D converter 103 produces a companded stream of 8-bit code words representing the voice, or voice and tone signals. Components 101, 102 may typically be located in a digital telephone set while the A/D converter 103 may be located in a line concentrator serving a number of telephone sets.

The digitally encoded signals received at the line concentrator are sampled at an 8 kHz rate and expanded to their full sixteen bit configuration in either expander 104 which, as is well-known, may employ either mu-law or A-law expansion. The expanded stream $s_i$ of digital code words is passed to signal block sampler 105 which defines successive frames of 180 code words. The stream of code words so defined may be sent on to other portions of the communications network (not shown) in the usual manner.

However, in accordance with an aspect of my invention, for the purposes of detecting any present DTMF tones, the stream of code words from sampler 105 is sent to decimator 201 which discards every other code word in the frame of 180 code words to derive a block containing only 90 code words. The output of decimator 201 is accordingly $d_i = s_{2i}$. Each code word output, $d_i$, is then applied either directly to both correlator 202 and to detection process 300 or, optionally, through high pass filter 201a depending on the setting of the option switch at the right of filter 201a. High pass filter 201a may be used, if desired, to remove any vestige of dial side tone and line noise.

Correlator 202 receives the decimated sequence $d_i$ and performs a correlation of each of the code words, i.e., it forms a sum of the products of each code word $d_i$ both with itself as well as with every code word preceding and succeeding it in the decimated block. The exact correlation performed by correlator 202 is defined in equations (1) and (2). Equation (1) defines five of the nine unique elements and equation (2) defines the remaining four elements required to form a 5×5 modified covariance matrix, R. (See equation (3), infra.) A 5×5 modified covariance matrix is selected because each of the DTMF tones giving rise to two complex frequencies is represented by four eigenvectors while the noise component gives rise to a single eigenvector. The vectors representing these four frequencies, plus the noise component, can be accommodated by a 5×5 matrix.

More particularly, equation (1) defines elements $r_{00}$, $r_{01}$, $r_{02}$, $r_{03}$ and $r_{04}$ of the modified covariance matrix. $r_{00}$ is the element of the modified covariance matrix composed of the sum of the correlation products of the code words of the decimated block. $r_{01}$ is the element of the matrix composed of the sum of the correlation products of adjacent code words in the decimated block. Similarly, $r_{04}$ is the element of the matrix composed of the correlation products of code words four words apart in the decimated block.

$$r_{0i} = \sum_{j=0}^{85} (d_j d_{j+i} + d_{j+4} d_{j+4-i}), \quad i = 0, \ldots, 4. \tag{1}$$

To fully understand the significance of equation (1) its values will be worked out at some length in equations (1a), (1b) and (1c) below for the first two and the last set of the five $r_{0i}$ elements of the 5×5 modified covariance matrix.

For $i=0$:

$$r_{00} = d_0 d_0 + d_4 d_4 + d_1 d_1 + d_5 d_5 + d_2 d_2 + d_6 d_6 + d_3 d_3 + d_7 d_7 + d_4 d_4 + d_8 d_8 + \ldots d_{85} d_{85} + d_{89} d_{89}. \tag{1a}$$

The group of correlations illustrated in equations (1a) defines element $r_{00}$ of the 5×5 modified covariance matrix. Element $r_{00}$ comprises a sum of terms, each of which is the correlation of each of the code words of the decimated block, beginning with the zeroth code word and ending with the self-correlation of the 89th code word. Upon closer inspection, it is to be noted that the symmetry of the correlations called for causes the $d_4 d_4$ in (2a) to be repeated. In fact, if all of the terms are worked out at length it will be found that the fourth through 85th pair of terms appear twice. This fact may be exploited to speed up processing the correlations, as is illustrated in the program set forth infra, (see Program Appendix, routine "modcov.c") by simply doubling the values found for the fourth through 85th terms without actually carrying out all of the remaining correlations in extenso.

For $i=1$:

$$r_{01} = d_0 d_1 + d_4 d_3 + d_1 d_2 + d_5 d_4 + d_2 d_3 + d_6 d_5 + d_3 d_4 + d_7 d_6 + d_4 d_5 + d_8 d_7 + \ldots d_{85} d_{86} + d_{89} d_{88}. \tag{1b}$$

The group of correlations in equation (1b) defines element $r_{01}$ of the 5×5 modified covariance matrix as a correlation of each code word with the immediately preceding and succeeding code words. Thus, the first term of $r_{01}$ consists of the product of the zeroth with the first word, the second term consists of the product of the fourth with the third code words and the last term of $r_{01}$ consists of the product of the 89th and 88th code words of the decimated block. It is likewise to be seen that equation (1b) also contains repeated terms such as $d_4 d_3$ and $d_3 d_4$ which may similarly be exploited to simply processing.

For i=4:

$$r_{04}=d_0 d_4+d_4 d_0+d_1 d_5+d_5 d_1+d_2 d_6+d_6 d_2+d_3 d_7 \\ +d_7 d_3+d_4 d_8+d_8 d_4+\ldots d_{85}d_{89}+d_{89}d_{85}. \quad (1C)$$

The group of correlations in equations (1c) defines element $r_{04}$ of the 5×5 modified covariance matrix as a correlation of each code word with preceding and succeeding code words that are four words apart. Thus, the first term of $r_{04}$ consists of the correlation of the fourth and the zeroth code word and the last term of $r_{04}$ consists of the correlation of the 85th and 89th code words of the decimated block. Note here too, the duplication of terms such as $d_0 d_4$ and $d_4 d_0$ whose occurrence may similarly be exploited.

The four $r_{ik}$ elements of the 5×5 modified covariance matrix computed by correlator 202 are elements $r_{11}$, $r_{12}$, $r_{13}$ and $r_{22}$ which are defined by the following equation (2):

$$r_{ik}=r_{i-1,k-1}+d_{4-i}d_{4-k}-d_{90-i}d_{90-k} \\ -d_{i-1}d_{k-1}+d_{85+i}d_{85+k}, \quad (2)$$

For k=i, ..., 4−i and i=1,2. (2)

For example, element $r_{11}$ is defined from equation (2) as:

$$r_{11}=r_{00}+d_3 d_3-d_{89}d_{89}-d_0 d_0+d_{86}d_{86}. \quad (2a)$$

Similarly, element $r_{13}$ is defined from equation (2) as:

$$r_{13}=r_{02}+d_3 d_1-d_{89}d_{87}-d_0 d_2+d_{86}d_{88}. \quad (2b)$$

Finally, the element $r_{22}$ is defined from equation (2) as:

$$r_{22}=r_{11}+d_2 d_2-d_{88}d_{88}-d_1 d_1+d_{87}d_{87}. \quad (2c)$$

Correlator 202 thus performs correlations of each code word in the decimated block with both succeeding code words (i.e., "forward" correlations), as well as correlations of code words with preceding code words in the decimated block (i.e., "backward" correlations). It should be noted that every element in modified covariance matrix R has the same number of terms. That matrix may now be filled according to:

$$R = \begin{bmatrix} r_{00} & r_{01} & r_{02} & r_{03} & r_{04} \\ r_{01} & r_{11} & r_{12} & r_{13} & r_{03} \\ r_{02} & r_{12} & r_{22} & r_{12} & r_{02} \\ r_{03} & r_{13} & r_{12} & r_{11} & r_{01} \\ r_{04} & r_{03} & r_{02} & r_{01} & r_{00} \end{bmatrix}. \quad (3)$$

It may be observed that matrix R is a 5×5 centrosymmetric matrix and that only nine of its 25 elements are unique. Since there are only nine unique elements, all of the elements of the modified covariance matrix are now known. The 5×5 modified covariance matrix will have five eigenvectors, four due to the complex frequencies arising from the two DTMF tones (if present) and the fifth due to the noise. To more easily identify these eigenvectors, and their associated eigenvalues, the 5×5 matrix is partitioned into submatrices.

Process 203 constructs the 3×3 conjugate submatrix $R_0$ by partitioning the modified covariance matrix R, according to:

$$R_o = \begin{bmatrix} r_{00}+r_{13} & r_{01}+r_{03} & \sqrt{2}\, r_{02} \\ r_{01}+r_{03} & r_{11}+r_{04} & \sqrt{2}\, r_{12} \\ \sqrt{2}\, r_{02} & \sqrt{2}\, r_{12} & r_{22} \end{bmatrix} = \quad (4)$$

$$\begin{bmatrix} A+Bj & \sqrt{2}\, x \\ \sqrt{2}\, x^T & \alpha \end{bmatrix}.$$

where:

$$A = \begin{bmatrix} r_{00} & r_{01} \\ r_{01} & r_{11} \end{bmatrix}, B = \begin{bmatrix} r_{03} & r_{13} \\ r_{04} & r_{03} \end{bmatrix}, \quad (5)$$

$$J = \begin{bmatrix} 0 & 1 \\ 1 & 0 \end{bmatrix}, x = \begin{bmatrix} r_{02} \\ r_{12} \end{bmatrix},$$

$x^T = [r_{02}\, r_{12}]$ and $\alpha = [r_{22}]$.

Process 204 partitions the modified covariance into the 2×2 anticonjugate submatrix $R_e$, as follows:

$$R_e = \begin{bmatrix} r_{00}-r_{13} & r_{01}-r_{03} \\ r_{01}-r_{03} & r_{11}-r_{04} \end{bmatrix} = [A - BJ]. \quad (6)$$

Process 205 computes the partial inverse of the conjugate submatrix $R_o$ while process 207 computes the eigenvalues and eigenvectors of the partially inverted conjugate submatrix. It will be recalled from the principles of matrix algebra that the inverse of a matrix may be found by computing the co-factor of each element of the matrix, transposing the matrix formed of the appropriately signed co-factors and then dividing by the determinant of the original matrix. The partial inversion performed by process 205 omits the step of dividing by the determinant.

The eigenvectors of the conjugate submatrix $R_o$ are:

$$\begin{bmatrix} y_i \\ \beta_i \end{bmatrix} i = 0, \ldots, 2; \text{ where } \underline{y_i} \text{ is } 2 \times 1 \text{ and } \beta_i \text{ is } 1 \times 1. \quad (7)$$

Process 206 computes the eigenvalues of the anticonjugate matrix. The eigenvectors of the anticonjugate submatrix $R_e$ are:

$$[\underline{z_i}] i=0,1; \text{ where } \underline{z_i} \text{ is } 2\times 1. \quad (8)$$

The eigenvectors of the submatrices $R_o$ and $R_e$ are both more easily found than directly attempting to calculate the eigenvectors of the larger matrix R. Moreover, the submatrices are easily inverted. The eigenvectors of the modified covariance matrix are related to the eigenvalues of the conjugate and anticonjugate matrices by:

$$v_i = \frac{1}{\sqrt{2}} \begin{bmatrix} y_i \\ \sqrt{2}\beta_i \\ Jy_i \end{bmatrix}, i = 0, 1, 2, \tag{9}$$

and $$w_i = \frac{1}{\sqrt{2}} \begin{bmatrix} z_i \\ 0 \\ -Jz_i \end{bmatrix}, i = 0, 1, \tag{10}$$

where $v_i$ and $w_i$ are $5 \times 1$ and are the eigenvectors of the modified covariance matrix.

Process 207 advantageously employs the power method described, for example, in *Numerical Methods*, Hornbeck, R. W., Quantum Publishers 1975, pp 231 to recursively compute the largest eigenvalue and its associated eigenvector of the partially inverted conjugate submatrix $R_p^{-1}$, where $R_p^{-1} = R_o^{-1}\det(R_o)$. The eigenvector associated with the largest eigenvalue, $\lambda_p$, of the partially inverted conjugate submatrix identifies, indirectly, (equation 9) the noise eigenvector $n_e$ of the matrix R. The noise eigenvector is sent on to process 208. The associated noise eigenvalue, $$\lambda_n = \frac{\det(R_o)}{\lambda_p}.$$

Process 206 also computes the two eigenvalues of the anticonjugate submatrix $R_e$ using the quadratic formula. The smallest of these, $\lambda_4$, corresponds to the smallest signal eigenvalue of the modified covariance matrix. Process 208 determines the ratio of these two eigenvalues $\lambda_4/\lambda_n$. If this ratio is less than a predetermined amount, process 209 will set the noise eigenvector to 0.

The signal space vector is:

$$s_i = \begin{bmatrix} e^{0j\omega} \\ e^{1j\omega} \\ e^{2j\omega} \\ e^{3j\omega} \\ e^{4j\omega} \end{bmatrix}, \tag{11}$$

while the noise eigenvector $n_e$ is:

$$n_e = \begin{bmatrix} n_0 \\ n_1 \\ n_2 \\ n_3 \\ n_4 \end{bmatrix}. \tag{12}$$

The dot product of the signal space and the noise eigenvectors is formed by multiplier 209:

$$\begin{bmatrix} e^{0j\omega} \\ e^{1j\omega} \\ e^{2j\omega} \\ e^{3j\omega} \\ e^{4j\omega} \end{bmatrix} \cdot \begin{bmatrix} n_0 \\ n_1 \\ n_2 \\ n_3 \\ n_4 \end{bmatrix} = n_0 e^{0j\omega} + n_1 e^{1j\omega} + n_2 e^{2j\omega} + n_3 e^{3j\omega} + n_4 e^{4j\omega}. \tag{13}$$

Recognizing that the eigenvectors of a modified covariance matrix are symmetric, i.e., $n_0 = n_4$, and $n_1 = n_3$, factoring out $e^{2j\omega}$ and setting the product equal to 0 (because the signal space and the noise space vectors are orthogonal, so their dot product must be 0), gives:

$$e^{2j\omega}(n_0 e^{-j2\omega} + n_1 e^{-j\omega} + n_2 + n_1 e^{j\omega} + n_0 e^{j2\omega}) = 0. \tag{15}$$

In order for the equation (15) to be 0, the expression within the parenthesis must be zero. Grouping terms within the parenthesis and recognizing that $2\cos\omega = e^{j\omega} + e^{-j\omega}$, we have:

$$2n_0 \cos 2\omega + 2n_1 \cos \omega + n_2 = 0. \tag{16}$$

The roots of equation (16) define the DTMF tones present. The roots of equation (16) are easily found by determining the values between which the polynomial changes sign. Straight line interpolation between these at the intersection with the x-axis determines the location of the roots.

Figure 2:
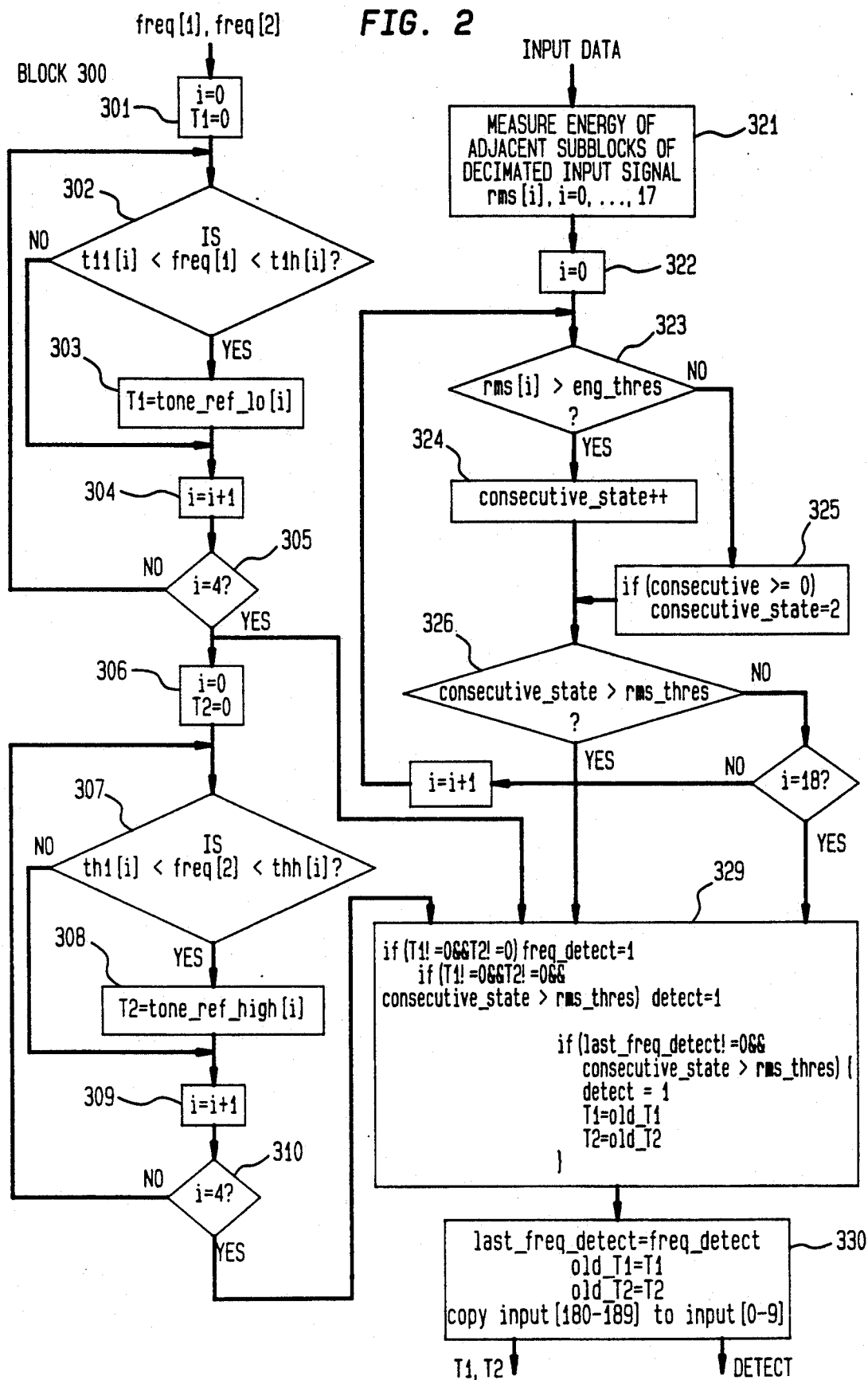
FIG. 2 shows the process executed by block 300 of FIG. 1.

Refer now to FIG. 2 which is a flow chart showing the process executed by block 300 of FIG. 1. At the top left the two frequencies found by the search routine are delivered to block 301. These two are tested in blocks 302 and 307 to determine if they correspond to the permitted low and high frequency tones. Each of these must be within a predetermined frequency tolerance. If the two tones are found to be within tolerance, block 303 sets T1 to the low tone that was found and block 308 sets T2 to the high tone found.

At the top right of FIG. 2 the decimated signal stream is entered into block 321 to measure the energy in adjacent subblocks. This process computes the energy of signal subblocks in an overlapping manner by taking half of the words of one subblock and half the words of the preceding subblock, according to the following:

$$rms_i = \sum_{k=0}^{9} d^2_{10i-5+k} \quad i = 0, N/10 - 1 \tag{17}$$

In block 323 each subblock energy measurement is compared against a predetermined threshold. If the measured energy exceeds the threshold, a counter "consecutive_state" is incremented. If the measured energy does not exceed the threshold, block 325 decrements counter consecutive_state by 2 if it had accrued a nonnegative count. If the counter consecutive_state exceeds threshold, rms_thresh, control is transferred to block 329. If consecutive_state does not exceed the threshold and all subblocks have not been evaluated, the process of rms evaluation is continued for the next subblock.

Block 329 is entered when all 18 subblocks have been evaluated or if consecutive_state has exceeded rms_thresh. If T1 and T2 are nonzero, flag freq_detect is set to 1. If T1 and T2 are nonzero and consecutive_state exceeded rms_thresh, flag "detect" is set to 1. Finally, if flag last_freq_detect is nonzero, and consecutive_state exceeds rms_thresh, "detect" is set to 1, T1 is set to old_T1, and T2 is set to old_T2. Once completed, block 330 sets last_freq_detect to freq_detect and old_T1 to T1 and old_T2 to T2. Thus the two tones T1 and T2 and the flag "detect" are sent to the telephone call processing routines (not shown) being executed by the digital signal processor. In addition, as is shown in the Program Appendix for the routine detect.c, block 330 copies the ten most recent samples of array is [], is [180–189], into is [0–9].

Thus far the method of my invention has been described for detecting the two signalling tones which give rise to four complex frequencies. It should be apparent that the equations above may be generalized as follows where a digital signal processor may be employed to detect n digitally encoded complex tones and the modified covariance matrix R has a rank equal to one more than the number of complex frequencies. In such case, the elements $r_{oi}$ of the modified covariance matrix would be determined by:

$$r_{0i} = \sum_{j=0}^{jmax-n-1} (d_j d_{j+1} + d_{j+n} d_{j+n-i}), i = 0, \ldots, n \quad (18)$$

and elements $r_{ik}$ of said modified covariance matrix are determined according to:

$$r_{ik} = r_{i-1}, \\ k-1 + d_{n-i} d_{n-k} - d_{jmax-i} d_{jmax-k} \\ -d_{i-1} d_{k-1} + d_{jmax-n-1+i} \text{ for } k=i, \ldots, n-i \\ \text{and } i = 1, \ldots \lfloor n/2 \rfloor \quad (19)$$

where $\lfloor n/2 \rfloor$ indicates the largest integer which is equal to or smaller than n/2. Further and other changes may be made by those skilled in the art without however departing from the spirit and scope of my invention.

Detailed Description of Program in Appendix

While the process described with respect to FIG. 1 is contemplated for use in a digital signal processor such as the well-known Texas Instruments TMS320 series, the C50 code language for programming that processor is not as well known as the more popular C-language. Accordingly, this appendix provides a C-language listing of a program which simulates the process described with respect to FIG. 1.

The main program is entitled DTMF.C. This program accepts an input data file such as a standard test tape that is conventionally used to test DTMF receivers. DTMF.C sets up the input/output, reads in 180 samples at a time and calls the DTMF_detection routine. The output of DTMF_detection is the two DTMF tones T1 and T2 and a detect switch which is high when the tones are present and low otherwise. In the initial declarations of DTMF.C, the reference to "include define.h" refers to a file which defines "len" as 180 and FILTLEN as 4. The array is [len+10] is defined as having 190 elements, i.e., ten more elements than the length of the 180 samples so that there will be room for ten samples to overlap.

When main program DTMF.C calls the DTMF_detection routine, it passes the address of the tenth element "&is[10]" of the 190 element array containing the 180 samples as a pointer.

The routine DTMF_detection defines a 90 element array called "data", defines the dimensions of the matrix R as a square array of size FILTLEN+1, i.e., 5×5, and calls routine "filt(inptr, data)", passing it the address of the tenth element in the parameter "inptr".

The routine eigenanalysis partially inverts the conjugate submatrix of the modified covariance matrix (calculated in modcov.c), i.e., the final step of a conventional matrix inversion (dividing by the determinant) is omitted. The eigenvector power calculation is then performed. An iteration of 5 is used. The eigenvalue is computed. The anticonjugate matrix is formed. The smallest eigenvalue of the anticonjugate matrix is computed through the quadratic equation. The ratio of eigenvalues is measured against a predetermined threshhold. If the ratio is too low, the noise eigenvector is set to zero so that no tone present will be detected.

The routine search finds zero crossings of the polynomial using a coarse search followed by linear interpolation. The two zero crossings are the two tones.

The routine detect checks to see if two tones are DTMF tones. It then measures the mean square value of the signal burst segments to see if the tone burst is long enough to be valid.

APPENDIX

```
/******************************************************** main routine sets up i/o. Calls DTMF_detection

********************************************************/ include <stdio.h>

FILE *fp1, *fp2;

#include "define.h"

int stop=0;

int is[len+10], T1, T2, detect;

int out[len];

char infile[80], outfile[80];

main()

{ int i,ix;
```

```c
    printf ("enter input file : ");
    scanf("%s",infile);
    printf ("enter output file : ");
    scanf("%s",outfile);
    fp1 = fopen(infile,"rb");
    fp2 = fopen(outfile,"wb");
/* input array */
    while ( (ix = fread(&is[10],sizeof(int),len,fp1) ) == len) {
/* input: data sequence - is 180 short integers
   output: frequencies - T1, T2, detection_flag - detect */
        DTMF_detection ( &is[10], &detect, &T1, &T2);
/* output */
        for(i=0;i<180;i++)
            out[i] = 10000*detect;
        fwrite(out,sizeof(int),180,fp2);
    }
    fclose(fp1);
    fclose(fp2);
}

/* Program name: DTMF_det.c
Description: Main processing routine for DTMF detection. Performs filtering, matrix generation, analysis, search and detection.
Inputs: inptr - address of data array points to input.array[10]
Outputs: detect - pointer to detection flag
         T1    - low tone detected
         T2    - high tone detected */
#include "define.h"
float data[len/2];
static float R[FILTLEN+1][FILTLEN+1];
static float freq_coef[FILTLEN], freq[FILTLEN/2];
void DTMF_detection (inptr, detect, T1, T2)
int *inptr, *detect, *T1, *T2;
{
/* high pass data and decimate data */
    filt (inptr, data);
/* generate correlation matrix (modified covariance method) */
    modified_covariance(data, R);
/* find polynomial coefficients thru eigenanalysis */
    eigenanalysis (R, freq_coef);
/* search for frequencies on unit circle */
    search (freq_coef, freq);
/* tone detection and guard time analysis */
``` detection (inptr, freq, T1, T2, detect);
}
/* user changeable thresholds */ float false_thres = 140.; /* used to reduce false detections; larger less detection, smaller more */ int rms_thres = 29;

float eng_thres = 20000000./2.;

float C_TABLE[] = {

1.1253E-0002, 8.7070E-0003,

-5.2418E-0002, 2.4770E-0002, 1.5199E-0002, 1.3085E-0002,

-4.4091E-0003,

-1.5770E-0002,

-1.6731E-0002,

-4.0287E-0003, 1.3880E-0002, 2.3558E-0002, 1.5130E-0002,

-8.4098E-0003,

-3.0682E-0002,

-3.2011E-0002,

-4.7676E-0003, 3.6891E-0002, 6.1494E-0002, 3.8362E-0002,

-4.1127E-0002,

-1.5338E-0001,

-2.5170E-0001, 7.0930E-0001,

-2.5170E-0001,

-1.5338E-0001,

-4.1127E-0002, 3.8362E-0002, 6.1494E-0002, 3.6891E-0002,

-4.7676E-0003,

-3.2011E-0002,

-3.0682E-0002,

-8.4098E-0003, 1.5130E-0002, 2.3558E-0002, 1.3880E-0002,
-4.0287E-0003,
-1.6731E-0002,
-1.5770E-0002,
-4.4091E-0003,
1.3085E-0002,
1.5199E-0002,
2.4770E-0002,
-5.2418E-0002,
8.7070E-0003,
1.1253E-0002};

int address=0;

int QHALF=8192;

int input_delays[] = {0,0,0,0,0,0,0,0,0,0,0,0,0,0,0,0,0,0,0,0,0,0,0,
0,0,0,0,0,0,0,0,0,0,0,0,0,0,0,0,0,0,0,0,0,0,0,0};

int scratchfil;

int costable[] = { 9630, -5063, 7438, -9630, 5063, -13255, 2563, -15582, 0, -16384, -2563,
        -15582, -5063, -13255, -7438, -9630, -9630, -5063, -11585, 0, -13255,
        5063, -14598, 9630};         /* Q14 */

/* Program name : filt2.c
   Description : decimate input data by 2 (no filtering) then high pass filters data to remove dialtone echo and line noise
   Inputs :    inptr - array of 180 samples
   Outputs :   data - array of 90 decimated and filtered samples
   Instruction cycles / call :
   Memory refs :  C_TABLE - array of 47 FIR filter coefficients
*/ extern float C_TABLE[];

static float buffer[90+46];

void filt (inptr, outPtr)

float outPtr[];

int inptr[];

{ int i,j;

/* decimate input (no filtering) and move into buffer */ for (i=0;i<90;i++)

buffer[46+i] = (float)inptr[2*i];

/* FIR 47-tap hi-pass filter cutoff 600 hz. (sampling rate 4000 hz.) */ for (i=0;i<90;i++){ outPtr[i] = 0.0;

for (j=0;j<47;j++)

outPtr[i] += buffer[46+i-j] * C_TABLE[j];

}

/* shift history down */

```
    copy (&buffer[90], buffer, 46);
}
/* Program name : modcov.c
Description : generate 9 modified covariance terms
           R[0][0], R[0][1], R[0][2], R[0][3], R[0][4],
           R[1][1], R[1][2], R[1][3], R[2][2]
Inputs :  s - pointer to 90 sample data array
Outputs : R - 9 elements (see above) of the modified covariance matrix
*/
#include "define.h"
void modified_covariance(s,R)
float R[FILTLEN+1][FILTLEN+1];
float *s;
{
   int i, j;
   for (i=0;i<=FILTLEN;i++) {
      R[0][i] = 0.0;
      for (j=FILTLEN-i;j<len/2-FILTLEN;j++)
          R[0][i] += s[j+i]*s[j];
      R[0][i] *= 2.0;
      for (j=0;j<FILTLEN-i;j++)
          R[0][i] += s[j+i]*s[j];
      for (j=len/2-FILTLEN;j<len/2-i;j++)
          R[0][i] += s[j+i]*s[j];
   }
   for (i=1;i<=FILTLEN/2;i++) {
      for (j=i;j<=FILTLEN-i;j++)
          R[i][j] = R[i-1][j-1] + s[FILTLEN-i]*s[FILTLEN-j]
                   - s[len/2-i]*s[len/2-j]
                   - s[i-1]*s[j-1]
                   + s[len/2-FILTLEN+i-1]*s[len/2-FILTLEN+j-1];
   }
}
```

/* Program name: eigenana.c

Description: reduces input matrix (5x5) to its conjugate (3x3), partially inverts matrix, searches for largest eigenvalue and corresponding eigenvector using power method (5 iterations), computes anti-conjugate matrix, inverts it and calculates smallest eigenvalue using quadratic formula, measures ratio of 2 smallest eigenvalues of input matrix for false detection, computes polynomial coefficients based on noise eigenvector of inverted conjugate matrix Inputs : R - elements of modified covariance matrix Outputs : coefs - polynomial coefficients */

```
#include "define.h"
#include <math.h>
#define maxx(A,B) (A) > (B) ? A : B
```

```
extern float false_thres;
float l1, eig_value;
static float max, det, bb, aa,l2;
static float a[3][3],b[3][3];
static float tmp[3];
static float eig_vect[] = {1.0, 1.0, 1.0};
static float coefs[5];
void eigenanalysis (R, coefs)
float R[FILTLEN+1][FILTLEN+1];
float coefs[];
{
    int i,j,k,order;
    float lambda[3];
/* compute A + B'J     B'- B transpose; J - reflection matrix */
    a[0][0] = R[0][0] + R[0][4];
    a[0][1] = R[0][1] + R[0][3];
    a[1][1] = R[1][1] + R[1][3];
    a[0][2] = a[0][2] = R[0][2]*1.4142135;
    a[1][2] = a[1][2] = R[1][2]*1.4142135;
    a[2][2] = R[2][2];
/* compute partial inverse */
    b[0][0] = a[1][1]*a[2][2] - a[1][2]*a[1][2];
    b[0][1] = -a[0][1]*a[2][2] + a[0][2]*a[1][2];
    b[0][2] = a[0][1]*a[1][2] - a[0][2]*a[1][1];
    b[1][1] = a[0][0]*a[2][2] - a[0][2]*a[0][2];
    b[1][2] = -a[0][0]*a[1][2] + a[0][2]*a[0][1];
    b[2][2] = a[0][0]*a[1][1] - a[0][1]*a[0][1];
    if ((det = a[0][0]*b[0][0] + a[0][1] * b[0][1] + a[0][2]*b[0][2]) < 0)det=0.0;
    for (i=0;i<5;i++) {
        tmp[0] = b[0][0] * eig_vect[0] + b[0][1] * eig_vect[1] + b[0][2] * eig_vect[2];
        tmp[1] = b[0][1] * eig_vect[0] + b[1][1] * eig_vect[1] + b[1][2] * eig_vect[2];
        tmp[2] = b[0][2] * eig_vect[0] + b[1][2] * eig_vect[1] + b[2][2] * eig_vect[2];
        max = maxx(fabs(tmp[0]), fabs(tmp[1]) );
        max = maxx( max, fabs(tmp[2]) );
        if ( max != 0.0 )
            max = 1.0/max;
        for (j=0;j<3;j++)
            eig_vect[j] = tmp[j]*max;
    }
    eig_value = det * max;
    max = 0.0;
    if ( eig_vect[0] != 0.0)
        max = 1.0/eig_vect[0];
```

```
    coefs[0] = eig_vect[1]* max;
    coefs[1] = 1.414213562 * eig_vect[2]*max;
/* compute b = inv(A - B'J)      B'- B transpose; J - reflection matrix */
    b[1][1] = R[0][0] - R[0][4];
    b[0][1] = -R[0][1] + R[0][3];
    b[1][0] = -R[0][1] + R[0][3];
    b[0][0] = R[1][1] - R[1][3];
    det = b[0][0]*b[1][1] - b[0][1] * b[0][1];
    bb = b[0][0]+b[1][1];
    aa = (bb*bb) - 4.0*det;
    l1 = 0.0;
    if ( aa > 0.0)
      l1 = 0.5 * ( bb - sqrt(aa) );
    if ( l1 < false_thres * eig_value )
      coefs[0] = coefs[1] = 0.0;       }

/* Program name : search.c
Description : computes zero crossings of 2*cos(2wn) + 2*alpha[0]*cos(wn) + alpha[1]
        where w = 2pi/sampling_rate, n is time index  when zero crossing found linear interpolation used to find
        precise zero crossing Note** - if input coefficients are zero then zero out frequencies and return
Inputs : alpha - polynomial coefficients
Outputs : freq - 2 frequencies (roots of polynomial */
#include "define.h"
#include <math.h>
#define mmax(A,B) (A) > (B) ? A : B
#define aabs(A) A > 0.0 ? A : -A
static float alpha[FILTLEN+1], freq[FILTLEN+1];
void search (alpha, freq)
float alpha[], freq[];
{
    int i,j, k=0;
    float th = 2.0 * 3.1415926/4000., xx1, xx2, q1, q2=1.0;
    float xres = 100.0;
    freq[0] = 0.0;
    freq[1] = 0.0;
    if ( alpha[0] == 0.0 && alpha[1] == 0.0 ) return;
    for (j=600;j<2500;j+=(int)xres) {
       q1 = 2.0 * cos( (FILTLEN/2) * j * th) + alpha[-1+FILTLEN/2];
       for (i=-2+FILTLEN/2;i>=0;i--)
          q1 += 2.0 * alpha[i] * cos( ((FILTLEN/2)-i-1) * j * th) ;
/* test if abs(q2-q1) > mmax(abs(q1),abs(q2))*/
       xx1 = q2-q1;
       xx1 = fabs(xx1);
```

```
            xx2 = mmax(aabs(q1),aabs(q2));
            if( xx1 > xx2 )
                freq[k++] = (float)j - xres*(q1/(q1-q2));
            q2 = q1;
            if (k==FILTLEN/2) break;
        }
    }
}
/* Program name : detect.c
Description : detection routine input frequencies found in search routine measures closeness to reference freq.
    measures energy of overlapped segments of input array for tone present and guard time analysis
Inputs : freq - 2 frequencies
         inptr - input array -> is[10]
Outputs : detect - detect flag
          T1 - low tone
          T2 - high tone */
#include <math.h>
#include "define.h"
#define mmax(A,B) (A) > (B) ? A : B
#define mmin(A,B) (A) < (B) ? A : B
extern int rms_thres;
extern float eng_thres;
float tone_lo[] = {697.0, 770.0, 852.0, 941.0};
float tone_hi[] = {1209.0, 1336.0, 1477.0, 1633.0};
float tll_t[] = {2.3, 2.3, 2.3, 2.3};
float tlh_t[] = {2.3, 2.3, 2.3, 2.3};
float thl_t[] = {2.3, 2.3, 2.3, 2.3};
float thh_t[] = {2.3, 2.3, 2.3, 2.3};
static float rmss[20];
static int oldt1=0, oldt2=0;
static float last_freq_detect=0, freq_detect=0;
int consec_state;
void detection( inptr, freq, T1, T2, detect)
float freq[];
int *T1, *T2, *detect, inptr[];
{
    int i,j;
    *T1 = 0;
    *T2 = 0;
    for (i=0;i<4;i++) {
        if ( (100.0-tll_t[i]) * tone_lo[i]/100. <= freq[0] && freq[0] <= (100.+tlh_t[i])*tone_lo[i]/100.) *T1 = (int)tone_lo[i];
        if ( (100.0-thl_t[i]) * tone_hi[i]/100. <= freq[1] && freq[1] <= (100.+thh_t[i])*tone_hi[i]/100.) *T2 =
```

```
        (int)tone_hi[i];
    }

/* guard time analysis */
    for (i=0;i<len/10;i++) {
        rmss[i] = 0.0;
        for (j=0;j<20;j+=2)
            rmss[i] += (float) inptr[i*10+j-10] * (float) inptr[i*10+j-10];
    }
    for (i=0;i<len/10;i++)    {
        if ( rmss[i] > eng_thres) consec_state++;
        if ( rmss[i] < eng_thres && consec_state >= 0) consec_state-=2;
        if (consec_state > rms_thres ) break;
    }

*detect = 0;
    freq_detect = 0;
    if (*T1 != 0 && *T2 != 0 ) freq_detect= 1;
    if (*T1 != 0 && *T2 != 0 && consec_state > rms_thres) *detect=1;
    if (last_freq_detect != 0 && consec_state > rms_thres) {
        *detect=1;
        *T1 = oldt1;
        *T2 = oldt2;
    }
    oldt1 = *T1;
    oldt2 = *T2;
    last_freq_detect = freq_detect;
    for (i=0;i<10;i++) inptr[i] = inptr[i+len];
} define len 180
define FILTLEN 4
```

What is claimed is:

1. In a digital signal processor, a method of detecting digitally encoded multifrequency tones appearing as n complex frequencies in a block of sequential code word signals, said block including voice and tone information as well as noise, comprising the steps of:

a. decimating said block of code word signals to increase the noise component thereof;

b. correlating each of said code word signals of said decimated block with itself and with adjacent and more distant code word signals in said decimated block on a forward and backward basis to define a data structure having the elements of a modified covariance data matrix R whose rank is equal to one more than the number of said complex frequencies, c. partitioning said matrix R into conjugate and anticonjugate submatrices, d. inverting said conjugate submatrix, e. isolating the noise eigenvector of said covariance matrix R by employing the eigenvector associated with the largest eigenvalue of said inverted conjugate submatrix, f. forming a polynomial from the dot product of the noise eigenvector with the signal; and g. determining the zero crossings of said polynomial to identify said multifrequency tones.

2. The method of claim 1 further comprising the steps of determining the two smallest eigenvalues of said modified covariance matrix and inhibiting said identification when the ratio of said two smallest eigenvalues is less than a predetermined amount.

3. The method of claim 2 wherein said smallest eigenvalues of said modified covariance matrix are determined by computing the smallest eigenvalue of said anticonjugate matrix and the smallest eigenvalue of said conjugate matrix.

4. The method of claim 1 wherein said forward and backward correlating of said code word signals includes correlating said code word signals separated from each other by up to n of said code word signals.

5. The method of claim 1 wherein $r_{0i}$ of said modified covariance matrix are determined according to:

$$r_{0i} = \sum_{j=0}^{jmax-n-1} (d_j d_{j+1} + d_{j+n} d_{j+n-i}), i = 0, \ldots, n.$$

where $d_j$ is one of said code word signals, and elements $r_{ik}$ of said modified covariance matrix are determined according to:

$$r_{ik} = r_{i-1, k-1} + d_{n-i} d_{n-k} - d_{jmax-i} d_{jmax-k} - d_{i-1} d_{k-1} + d_{jmax-n-1+i} d_{jmax-n-1+k} \text{ for } k=i, \ldots, n-i \text{ and } i=1, \ldots, n/2.$$

6. The method of claim 1 wherein n=4 and said matrix R is of rank 5.

7. A method of operating a digital signal processor to detect two digitally encoded multifrequency signals in a sampled block of sequential code words comprising the steps of:
   a. correlating pairs said code words of said block including all code words separated from each other by zero, one, two and three code words to define the elements of a 5×5 modified covariance data matrix;
   b. partitioning said matrix into conjugate and anticonjugate submatrices,
   c. inverting said conjugate submatrix;
   d. determining the noise eigenvector of said covariance matrix R from the eigenvector associated with the largest eigenvalue of said inverted conjugate submatrix;
   e. forming a polynomial from the product of the noise eigenvector with the signal; and
   f. determining the zero crossings of said polynomial to identify said multifrequency signals.

8. The method of claim 7 further comprising the steps of determining the two smallest eigenvalues of said anticonjugate submatrix and inhibiting said identification when the ratio of said two smallest eigenvectors is less than a predetermined amount.

9. A method of detecting digitally encoded multifrequency signals in the presence of noise, said multifrequency signal being represented by n complex frequencies, comprising the steps of:
   a. sampling the signals to form a block of jmax sequential code words $d_j$;
   b. correlating each code word of said block with itself and with adjacent and more distant code words on a forward and backward basis to define the elements $r_{0i}$ and $r_{ik}$ of an (n+1) by (n+1) modified covariance data matrix R, said elements $r_{0i}$ being determined according to $$r_{0i} = \sum_{j=0}^{jmax-n-1} (d_j d_{j+1} + d_{j+n} d_{j+n-i}), i = 0, \ldots, n$$

and said elements $r_{ik}$ being determined by:

$$r_{ik} = r_{i-1, k-1} + d_{n-i} d_{n-k} - d_{jmax-i} d_{jmax-k} - d_{i-1} d_{k-1} + d_{jmax-n-1+i} d_{jmax-n-1+k}, \text{ for } k=i, \ldots, n-i \text{ and } i=1, \ldots, \lfloor n/2 \rfloor;$$

c. partitioning said matrix R into a conjugate and anticonjugate submatrices and inverting the conjugate submatrix;
   d. isolating the noise vector of said covariance matrix R by determining the eigenvector associated with the largest eigenvalue of the inverted conjugate submatrix;
   e. forming a polynomial from the product of the noise and signal eigenvectors;
   f. determining the zero crossings of said polynomial to identify said multifrequency signals; and
   g. inhibiting said identification when the ratio of the smallest eigenvalue of the anticonjugate matrix to the noise eigenvalue is less than a predetermined amount.

10. The method of claim 9 wherein said elements $r_{0i}$ and $r_{ik}$ are arranged in a (5×5) modified covariance matrix R, where $$R = \begin{bmatrix} r_{00} & r_{01} & r_{02} & r_{03} & r_{04} \\ r_{01} & r_{11} & r_{12} & r_{13} & r_{03} \\ r_{02} & r_{12} & r_{22} & r_{12} & r_{02} \\ r_{03} & r_{13} & r_{12} & r_{11} & r_{01} \\ r_{04} & r_{03} & r_{02} & r_{01} & r_{00} \end{bmatrix}.$$

11. The method of claim 10 wherein said covariance matrix R is partitioned into a (3×3) conjugate matrix $R_0$, where $$R_0 = \begin{bmatrix} r_{00} + r_{13} & r_{01} + r_{03} & \sqrt{2}\, r_{02} \\ r_{01} + r_{03} & r_{11} + r_{04} & \sqrt{2}\, r_{12} \\ \sqrt{2}\, r_{02} & \sqrt{2}\, r_{12} & r_{22} \end{bmatrix} = \begin{bmatrix} A + Bj & \sqrt{2}\, x \\ \sqrt{2}\, x^T & \alpha \end{bmatrix}$$

and a 2×2 anticonjugate matrix $R_e$, where $$r_{0i} = \sum_{j=0}^{85} (d_j d_{j+1} + d_{j+4} d_{j+4-i}), i = 0, \ldots, 4.$$

12. The method of claim 11 wherein said determination of said zero crossings is accomplished using a fast search technique employing linear interpolation.

* * * * *